US009792595B2

(12) United States Patent
Lin

(10) Patent No.: US 9,792,595 B2
(45) Date of Patent: Oct. 17, 2017

(54) SECURE DATA TRANSFER FROM A VENDING DEVICE TO PORTABLE DATA STORAGE DEVICES

(71) Applicant: Hui Lin, Taipei (TW)

(72) Inventor: Hui Lin, Taipei (TW)

( * ) Notice: Subject to any disclaimer, the term of this patent is extended or adjusted under 35 U.S.C. 154(b) by 408 days.

(21) Appl. No.: 14/537,858

(22) Filed: Nov. 10, 2014

(65) Prior Publication Data

US 2016/0132872 A1    May 12, 2016

(51) Int. Cl.
*G06Q 20/00* (2012.01)
*G06Q 20/12* (2012.01)
*G06Q 20/40* (2012.01)
*G06Q 20/38* (2012.01)

(52) U.S. Cl.
CPC ....... *G06Q 20/1235* (2013.01); *G06Q 20/382* (2013.01); *G06Q 20/401* (2013.01)

(58) Field of Classification Search
CPC .................................................. G06Q 20/1235
See application file for complete search history.

(56) References Cited

U.S. PATENT DOCUMENTS

| 5,892,900 A * | 4/1999 | Ginter | G06F 21/10 726/26 |
| 2011/0047615 A1* | 2/2011 | Chou | G06F 21/10 726/19 |

* cited by examiner

*Primary Examiner* — Calvin L Hewitt, II
*Assistant Examiner* — Zehra Raza

(57) ABSTRACT

Techniques for transferring secured data from a vending device to a portable data storage device are described herein. The vending device receives a request from a user of the portable data storage device for digital contents to be stored on the portable data storage device and requests for a payment for the requested digital contents to be paid by the user. The vending device locates a first portable storage identification (PSID) parameter unique to the portable data storage device, and then generates a rights object including a second PSID parameter that is equal to the first PSID parameter to prevent the digital contents from being accessed at a data storage medium other than the portable data storage device. It is to be appreciated some or all of the above processing can be completed by a back-end device separate from the vending device.

1 Claim, 6 Drawing Sheets

SECURE DATA TRANSFER FROM A VENDING DEVICE TO PORTABLE DATA STORAGE DEVICES

CROSS REFERENCE TO RELATED PATENT APPLICATIONS

This application is a CPA (continued prosecution application) of U.S. patent application Ser. No. 12/981,199 which is assigned to the applicant of the present invention, and thus the contents of the application is hereby incorporated in its entirety by reference.

FIELD OF THE INVENTION

The present invention related to data transfer, and in particular to a secure data transfer from a vending device to a portable data storage device.

BACKGROUND

With the advancement in information technology, various forms of information can be recorded, stored and transferred in digital format as digital data. For example, audio, video and textual information such as songs, speeches, movies, literature and the like can be recorded and stored as digital data content on portable data storage media such as compact disc (CD), digital video disc (DVD) and memory cards. Among the various types of memory cards currently available on the market, secure digital (SD) cards are a type of memory cards that are widely used in portable devices such as digital cameras, digital camcorders, handheld computers, media players, mobile phones, personal entertainment devices, etc.

Users also desire to easily browse, review, or download digital data at a retail store to their portable data storage devices. The retail store may sell multiple forms digital data to the users such as audio (e.g., music), video (e.g., movies), pictures (e.g., photographs), and textual data (e.g., books or other types of compositions). However, existing technologies do not provide data security for data stored on portable data storage devices such that the users may easily share the downloaded data on their portable data storage devices to others, thereby infringing protection of copyright and other intellectual property rights associated with the downloaded digital data.

SUMMARY

The present disclosure provides techniques to transfer secured data from a vending device to a portable data storage device. Each portable data storage device includes or is assigned a first portable storage identification (PSID) parameter unique to the portable data storage device. Such first PSID parameter is either an identification parameter already existed and stored at the portable data storage device, such as a device serial number of the portable data storage device, or a unique identification parameter generated by the vending device and stored in the portable data storage device. Upon a request from a user to transfer data to the portable data storage device, the vending device locates the requested data either at the vending device or a data source other than the vending device, locates the first PSID parameter stored at the portable data storage device, creates a rights object including a second PSID parameter equal to the first PSID parameter, embeds the rights object into a data file including the requested data, and transfers the data file to the portable data storage device. Some of the steps such as creation of the rights object can be completed at another device separate to the vending device, and then the vending device receives results from the another device. The requested data in the data file cannot be accessed at the portable data storage device unless a control logic of the portable data storage device determines that the first PSID parameter equals the second PSID parameter at the rights object.

This summary is provided to introduce concepts relating to secure data storage and transfer for portable data storage devices. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The present disclosure describes techniques for secure data storage and transfer between a vending device and portable data storage devices. By locating or storing in a portable data storage device a first PSID parameter that is unique to the portable data storage device and requiring data, or digital contents, of a data file to be accessible only when a second PSID parameter, generated by the vending device and associated with the data file, matches the first PSID parameter, the concern regarding data security for data stored on portable data storage devices is believed to be addressed. Moreover, by encrypting data transferred between a portable data storage device and the vending device, security in data transfer is provided.

While aspects of described techniques relating to secure data storage and transfer for portable data storage devices can be implemented in any number of different forms of portable data storage devices, environments, and/or configurations, embodiments are described in context of the following exemplary system architecture(s).

Exemplary Store and Vending Device Environment

Figure 1:
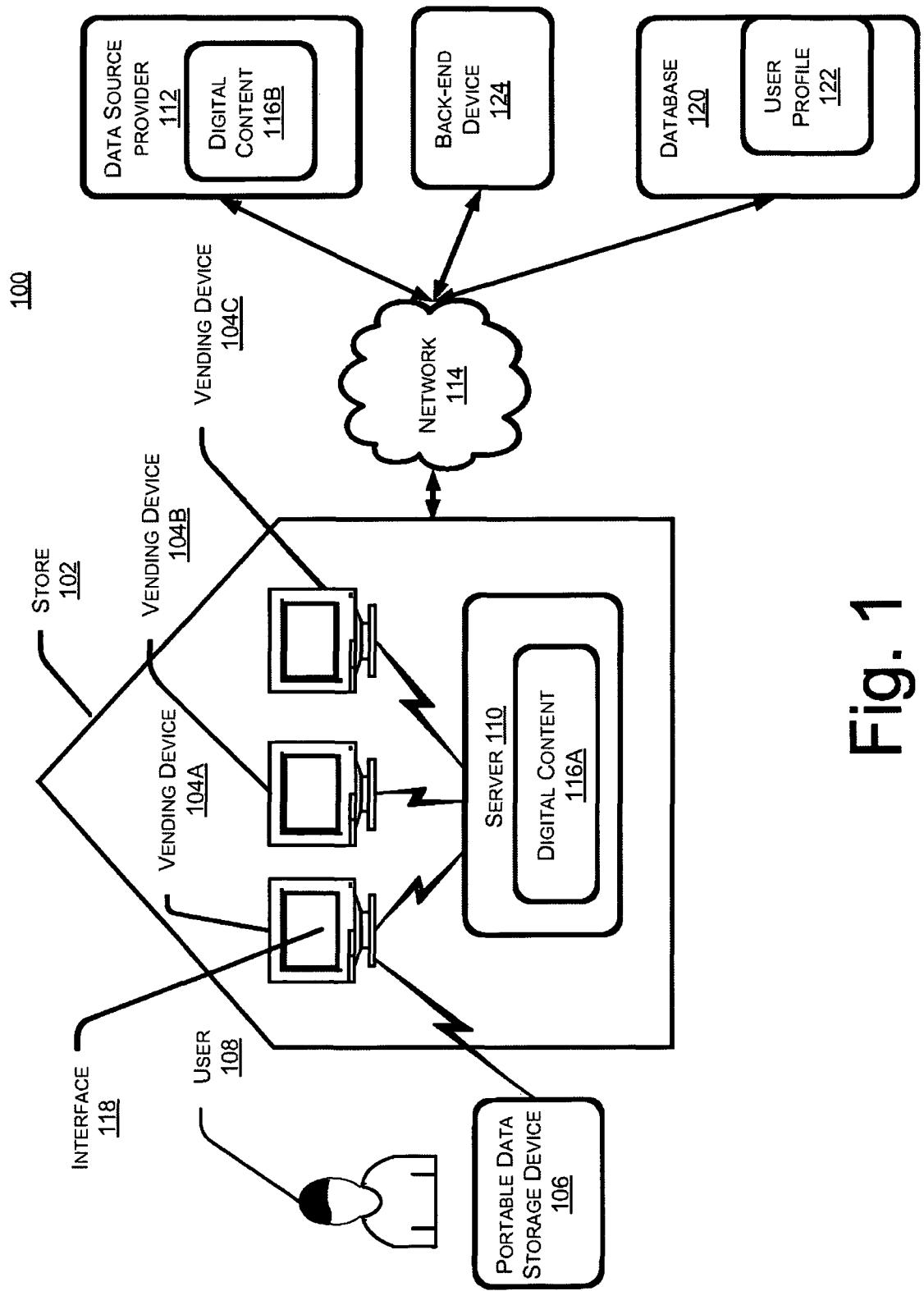
FIG. 1 illustrates an exemplary environment 100 at a store that facilitates data transfer between one or more vending devices and, a portable data storage device.

FIG. 1 illustrates an exemplary environment 100 at a store 102 that facilitates data transfer between one or more vending devices 104A-C and a portable data storage device 106. The vending devices 104A-C are machines located at the store 102 to locate and transfer data, upon a request of a user 108 of the portable data storage device 106, from a data source to the portable data storage device 106. In one embodiment, the vending device 104A requires a payment for transfer of the requested data. The data source includes the vending devices 104A-C, a server 110 located at the store 102, and/or a data source provider 112. The portable data storage device 106 may be a non-volatile memory card, such as a secure digital (SD) card for example.

The server 110 locates at the store 102 and connects with the one or more vending devices 104A-C so that each of the vending device 104A-C can access data stored on the server 110. The data source provider 112 is remotely connected with the server 110 or the one or more vending devices 104A-C at the store 102 or any other server or vending device (not shown) at any other store (not shown) through a network 114 such as the Internet or an intranet for example. Various data can be available and stored at the data source, including a digital content 116A stored at the sever 110 and a digital content 116B stored at the data source provider 112. The digital content 116A and 116B may be audio, video, picture, textual data, or a combination thereof.

The vending devices 104A-C can directly request for the digital content 116A at the server 110. The vending devices 104A-C can also directly request for the digital content 116B at the data source provider 112, or submits a request to the data source provider 112 through the server 110. A copy of the digital content 116B is firstly transferred from the data source provider 112 to the server 110, and then to the vending devices 104A-C.

The vending devices 104A-C can further include an interface 118 to facilitate communication with the user 108 to request for and select data.

In addition, there is also a database 120 to store a plurality of user profiles, each of which corresponding to a respective portable data storage device and its associated user, including a user profile 122 of the user 108. The database 120, as shown in FIG. 1, is connected with the server 110 or the vending devices 104A-C through the network 114. In some other embodiments, the database 120 can also be located at either of the vending devices 104A-C or the server 110. The user profile 122 is used to manage information of the user 108 and the portable data storage device 106, recommend data to the user 108, and facilitate payment of the payment, and so on. In some other embodiments, the data source provider 112 and the database 120 can also be located at the same computing device.

In addition to the database 120 and the data source provider 112, there may also be a back-end device 124 that processes some or all of the information input by the user 108 through the interface 118. In one embodiment, the vending device 104A may only receive input information, such as requested digital contents, and identification information of the portable data storage device 106, and then transfer such input information and identification information to the back-end device 124. The back-end device 124 searches the requested digital contents from multiple data sources including the data source provider 112, and the user profile 112 associated with the portable data storage device 106, calculates corresponding payment for the requested digital contents, and then returns results to the vending device 104A to be presented to the user 108 via the interface 118. In another embodiment, the vending device 104A, after receiving information from the user 108, firstly search the requested digital contents stored locally at the vending device 104A or the server 110. If the vending device 104A cannot locate the digital contents locally, it then transfers the information to the back-end device 124 for further processing, such as searching through the data source provider 112.

The back-end device 124, as shown in FIG. 1, is connected with the server 110 or the vending devices 104A-C through the network 114. In some other embodiments, the back-end device 124 can also be located at the server 110. In some other embodiments, the back-end device 124, the data source provider 112 and the database 120 can also be located at the same computing device.

Each of the data source provider 112 and the database 120 can be managed or owned by the same owner or operator of the store 102, or an independent third-party provider.

In an illustrative scenario, the user 108 of the portable data storage device 106 enters into the store 102 and connects the portable data storage device 102 with the vending devices 104A by wired or wireless communication. In one embodiment, the portable data storage device 106 is plugged into the vending device 104A to be communicatively coupled with the vending device 104A. For example, when the portable data storage device 106 is an SD card, it is plugged into an SD card receptacle (not shown) of the vending device 104A. In another embodiment, the portable data storage device 106 is connected with a reading device at the store 102 to be communicatively coupled with the vending device 104A. For example, when the portable data storage device 106 is an SD card, it is plugged into an SD card reader (not shown). The SD card reader may be connected with the vending device 104A by wireless communication, such as a wi-fi or bluetooth connection. In yet another embodiment, the portable data storage device 106 has a communication component and port supporting direct wired or wireless communication with the vending device 104A.

As an example of the vending device 104A, after establishment of a connection between the portable data storage device 106 and the vending device 104A, the user 108 can request for data, through the interface 118, to be transferred to the portable data storage device 106, and pay a corresponding payment through the interface 118 for the requested data. The description pertaining to vending device 104A throughout the present disclosure is applicable to the other illustrated vending devices 104B-C. For simplicity, the description will only refer to the vending device 104A.

There can be a plurality of payment calculations and payment schemes provided through the interface 118 of the vending device 104A. For example, the payment can be a flat fee per requested digital content, such as a song. The payment can also be a flat membership fee up to a threshold of requested digital contents if the user 108 is a member of the store 102. Whether the user 108 is a member can be searched through the user profile 122 of the database 120. The payment can also vary depending upon the requested digital content and the source of the requested digital content.

For example, the user 108 can render the payment by credit card by inputting credit card information through the interface 118 of the vending device 104A. The user 108 can also render the payment by deducting an amount from his/her pre-deposit account after the user 108 inputs his account information through the interface 118 and the vending device 104A determines that there is still sufficient balance in the account. The credit card information or the balance of account of the user 108 can also be pre-stored and searched through the user profile 122 of the database 120.

In one embodiment, the vending device 104A can inform the user 108, through the interface 118, an available location of the requested data, such as the vending device 104A, the server 110, or the data source provider 112, and informs the user that a higher fee may be requested for data available at the server 110 or the data source provider 112. In another embodiment, the vending device 104A hides details of physical locations of the requested data and do not show them to the user 108.

The vending device 104A can also provide other value-added services to the user 108. For example, in a scenario when the user 108 has limited time to browse and download the digital contents, the user 108 only needs to input names or other identification information of requested digital contents through the interface 118 of the vending device 104A. The Vending device 104A transfers the names or other identification information of the requested digital contents to the back-end device 124 located at the store 102 or remotely located and connected with the vending devices 104A-C through the network 114. A service provider, through the back-end device 124, locates and downloads the request digital contents in accordance with the names or other identification information, and stores the request digital contents in the portable data storage device 106 through the vending device 104A.

Further, the store 102 can also provide one or more of the following functionality through the interface 118: (1) sale of compact discs (CDs) music; (2) rental of movies, (3) sale of secure digital (SD) cards that store secured data-including movies, music, e-books, games, portraits, or legal adult videos (AVs); (4) sale of coffee and cake; (5) browse of music television (MTV) and three-dimension (3D) videos; (6) sale of SD cards; (7) sale of mobile devices; (8) sale of various media players; (9) service of advertisements; (10) pre-loading digital contents onto a SD card; (11) promotion of new products; (12) revenue sharing in the sale of digital contents; (13) sale of concert tickets; (14) charity service; and (15) community service including (a) payment collection; (b) goods delivery; (c) location of a person and a business provider; and (d) market research service.

Illustrative Transfer of Secured Data From/Through Vending Device

Figure 2:
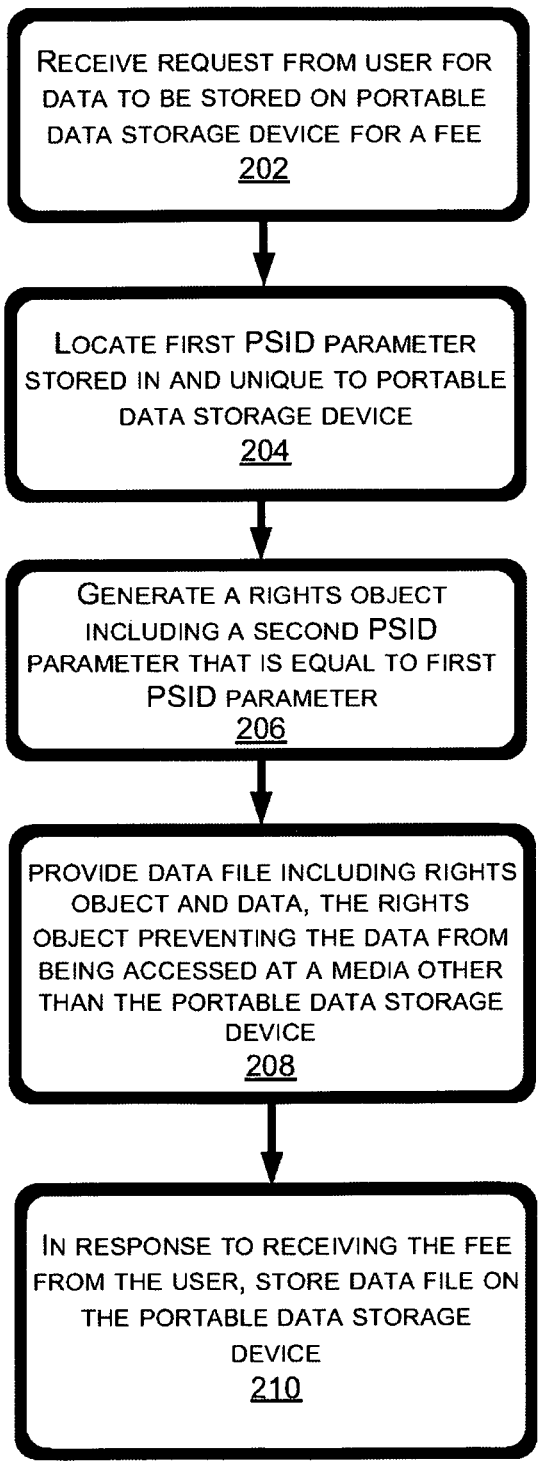
FIG. 2 illustrates an exemplary process 200 of transferring secured data from the vending device to the portable data storage device.

FIG. 2 illustrates an exemplary process 200 of transferring secured data from the vending device 104A to the portable data storage device 106.

At 202, a request is received from the user 108 for data that is available to be transferred to and stored on the portable data storage device 106 through the vending device 104A for a payment. The vending device 104A can search and locate the requested data. The data may be located at either the vending device 104 or a data source other than the vending device 104. If the requested data cannot be located, the vending device 104A returns an error message to the user 108 through the interface 118. If the requested data is located, the vending device 104A returns a successful message to the user 108 and may further provide a location of the requested data, such as whether the requested data is locally located at the vending device 104A or the server 110 or the data source provider 112.

At 204, a first portable storage identification (PSID) parameter unique to the portable data storage device 106 is located. The first PSID parameter is unique to the portable data storage device 106 and may be used as the identification of the portable data storage device 106. There can be various methods to locate the first PSID parameter.

In one embodiment, the first PSID parameter is an already-existed parameter stored at and unique to the portable data storage device 106. For example, the first PSID parameter can be a serial number of one or more data storage media (e.g., memories) included in the portable data storage device 106, a device serial number of the portable data storage device 106, a random number generated by a true random generator located at the portable data storage device 106, or a combination thereof generated by the portable data storage device 106. The vending device 104A locates the first PSID parameter by searching the portable data storage device 106 after the two are connected. Alternatively, the first PSID parameter may be provided to the vending device 104A by the portable data storage device 106 through a protocol upon connection.

Figure 3:
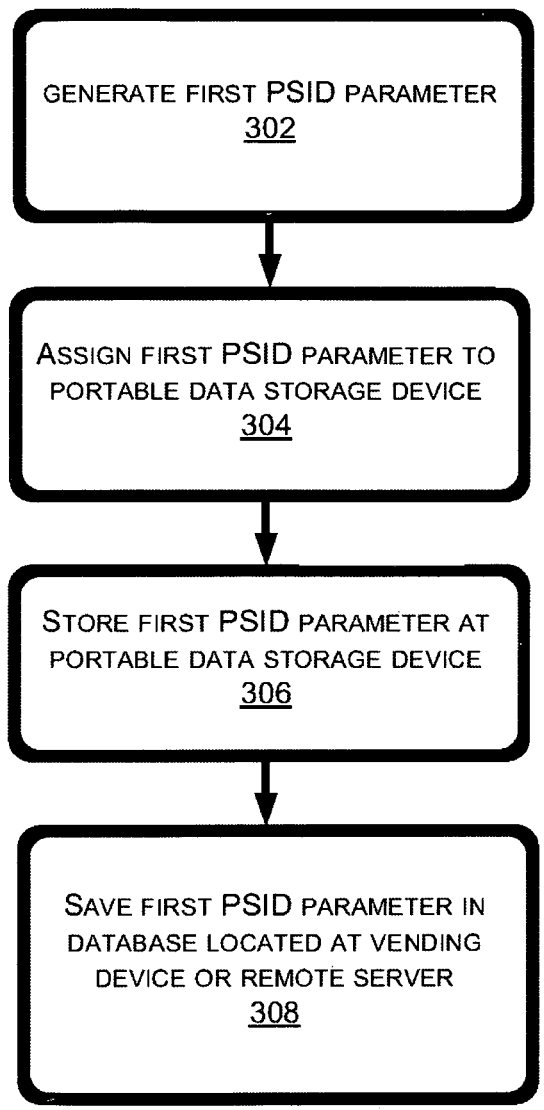
FIG. 3 illustrates an exemplary process 300 of generating the first PSID parameter by or through the vending device.
Figure 4:
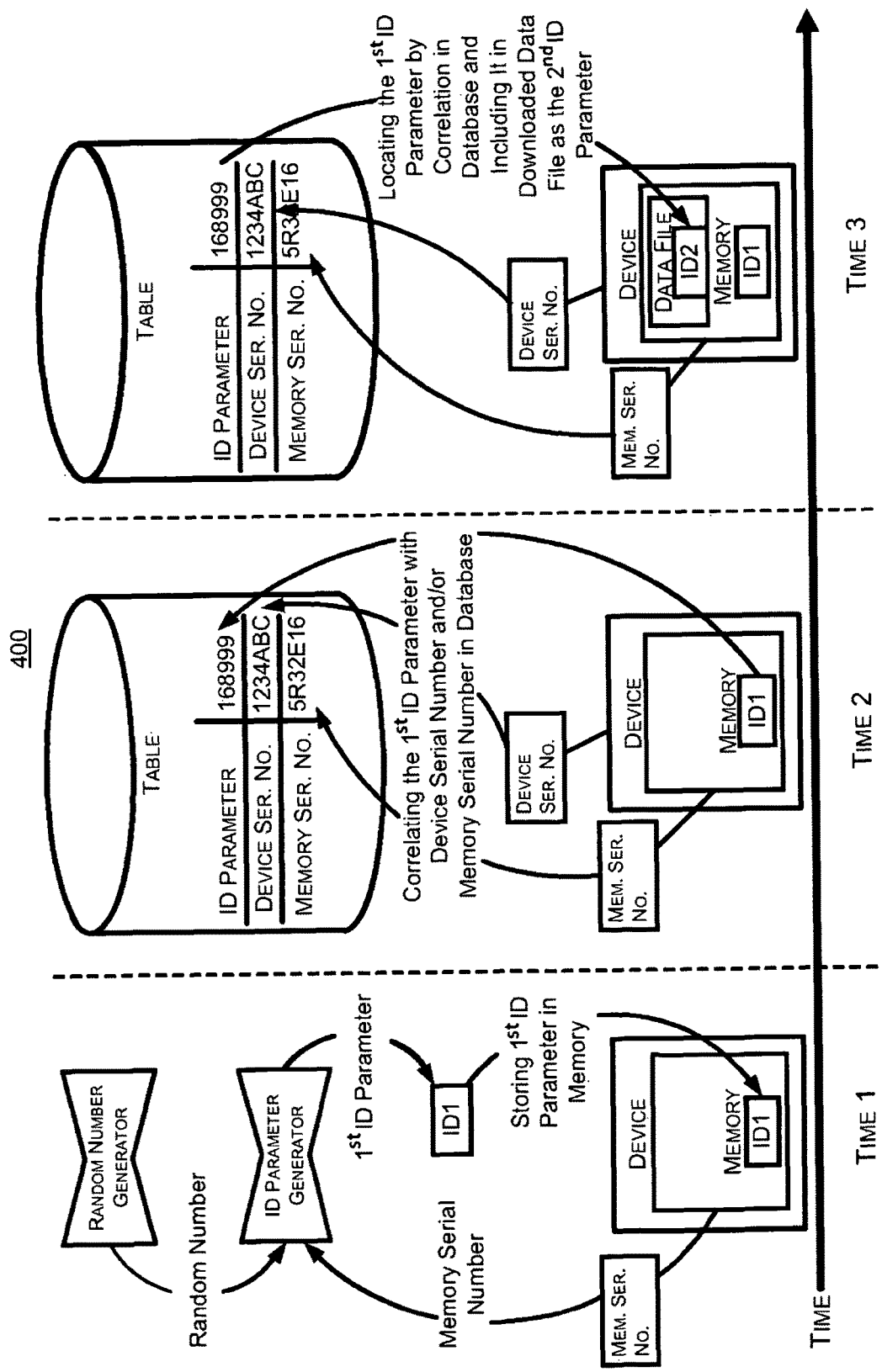
FIG. 4 illustrates a time diagram of a scheme 400 for secure data storage and transfer for portable data storage devices in accordance with the present disclosure.

In another embodiment, the first PSID parameter is generated by the vending device 104A and then stored in the portable data storage device 106. Details of an exemplary generation process are illustrated by FIGS. 3 and 4.

At 206, a rights object, including a second PSID parameter that is equal to the first PSID parameter, is generated. The rights object contains information that describes the access rights with respect to the data. For example, the information may describe the duration that the data is available to be accessed, the number of times the data is allowed to be accessed, etc. The rights object also contains a second PSID parameter. The second PSID parameter is set to be equal to the first PSID parameter when the data is downloaded to the portable data storage device 106.

In one embodiment, the vending device 104A generates the rights object including the second PSID parameter. In another embodiment, the vending device 104A transfers the located first PSID parameter information to another device, such as the back-end device 124 separate from the vending device 104A, and then receives the rights object including the second PSID parameter generated by the back-end device 124.

At 208, a data file including the rights object and the data is provided, where the rights object prevents the data from being accessed at a media other than the portable data storage device 106. The data file can be generated either by the vending device 104A, the server 110, or the back-end device 124.

For example, when the user 108 requests to access the data in the data file stored on the portable data storage device 106, the first PSID parameter and the second PSID parameter are compared. If the first PSID parameter and the second PSID parameter equal to each other, then the user is allowed to access the data. However, if the first PSID parameter and the second PSID parameter do not equal to each other, then access to the data is denied. Therefore, when the data file is copied to another portable data storage device other than the portable data storage device 106, which has a respective PSID parameter stored therein but different from the first PSID parameter, the data cannot be accessed by a user of that particular portable data storage device because its respective PSID parameter and the second PSID parameter in the data file are different. This is because each PSID parameter is unique to its respective portable data storage device.

At 210, in response to receiving the payment from the user 108, the data file is stored on the portable data storage device 106.

The process 200 can further comprise an action comprising causing the data in the stored data file at the portable data storage device 106 to be accessible to the user when control logic of the portable data storage device 106 determines the first PSID parameter and the second PSID parameter are equal.

The process 200 can further comprise an action comprising encrypting the data or the second PSID parameter in the data file, or decrypting the first PSID parameter in an event that the first PSID parameter is encrypted at the portable data storage device.

In one embodiment, at least one of the first PSID parameter or the second PSID parameter is encrypted, and the first PSID parameter, the second PSID parameter, or both the first and the second PSID parameters are decrypted before it is determined whether or not the first PSID parameter and the second PSID parameter are equal. For example, the vending device 104A can decrypt the first PSID parameter after locating the first PSID parameter and finding it is encrypted. The vending device 104A can also encrypt the data or the second PSID parameter in the data file.

In one embodiment, the data contained in the data file is encrypted with the Public Key Infrastructure (PKI) using a 1024-bit key before the data is transferred to the portable data storage device 106. Alternatively, the process 200 may further encrypt the data contained in the data file with the Advanced Encryption Standard (AES) before transferring data to the portable data storage device 106. This is believed to provide a strong protection of the data being transferred to and from the portable data storage device 106.

It is understandable that one or more of the above actions, such as generation of the rights object or the data file or encryption, can be completed by another device other than the vending device, and in such case the vending device receives results of such actions from such device.

FIG. 3 illustrates an exemplary process 300 of locating the first PSID parameter by generation of the first PSID parameter by or through the vending device 104A.

At 302, the first PSID parameter is generated. For example, the vending device 104A can generate the first PSID parameter without relying on parameters stored at the portable data storage device 106. In one embodiment, the vending device 104A can use a random number generated by a true random generator to generate the first PSID parameter.

Alternatively, the vending device 104A uses the already-existed parameter stored at and unique to the portable data storage device 106 to generate the first PSID parameter. In one embodiment, the already-existed parameter stored at and unique to the portable data storage device 106 includes the serial number of one or more data storage media (e.g., memories) included in the portable data storage device 106, the device serial number of the portable data storage device 106, the random number generated by the true random generator located at the portable data storage device 106, or any combination thereof.

For yet another example, the vending device 104A uses both the already-existed parameter stored at and unique to the portable data storage device 106 and another parameter to generate the first PSID parameter.

At 304, the first PSID parameter is assigned to the portable data storage device 106. The first PSID parameter cannot be assigned to another portable data storage device other than the portable data storage device 106.

At 306, the first PSID parameter is stored at the portable data storage device 106. The one or more data storage media of the portable data storage device 106 may include a protection section that stores one or more instruction codes, a partition table section that stores a partition table, a data file section that stores the data file, and a control logic section that stores a control logic which controls operations of the portable data storage device. In one embodiment, the first PSID parameter is stored in the control logic section. In another embodiment, the first PSID parameter is stored in the protection section. In yet another embodiment, the first PSID parameter is stored in the partition table section. In still another embodiment, the first PSID parameter is stored in the data file section.

In addition, the process 300 can further comprise saving the first PSID parameter in a database, such as the database 120, where PSID parameters for a plurality of portable data storage devices can be stored respectively. When the generated PSID parameters are stored at a central location such as the database 120, the vending device 104A can further check the database 120 to ensure that a newly created PSID parameter is unique and different from other existing PSID parameters.

The first PSID parameter, unique to the portable data storage device 106, can also be used as an index key of the user profile 122 of the user 108 and the portable data storage device 106. The user profile 122 is also stored in the database and includes information of the user 108 of the portable data storage device 106. The user profile can include information such as: the first PSID parameter, whether the user 108 is a member of the store 102, a balance amount of the user 108, and a history of requested and/or downloaded data.

In one embodiment, when the user 108 connects the portable data storage device 106 with the vending device 104A, the vending device 104A uses the first PSID parameter of the portable data storage device 106 to search the database 120 to locate the user profile 122 stored at the database 120. The vending device 104A can then further use information in the user profile 122 to recommend digital contents to the user 108 through the interface 118 and facilitate rendering of the payment.

It is understandable that one or more of the above actions, such as generation of the first PSID parameter, can be completed by a separate device other than the vending device 104A, and the vending device 104A can receive results of such actions from such separate device.

FIG. 4 illustrates a time diagram of a scheme 400 for secure data storage and transfer for portable data storage devices in accordance with the present disclosure.

During the initial stage, labeled as Time 1 in FIG. 4, a first identification parameter, such as the first PSID parameter, is generated by or through the vending device 104A as shown in FIG. 3 and then stored at the portable data storage device 106, such as an SD memory card for example, that has one or more data storage media, or memories, such as flash memories for example. The first identification parameter may be generated using the memory serial number that is unique to the one of one or more data storage media, the random number generated by the true random number generator, or both of the memory serial number and the random number.

For example, given that each memory in the portable data storage device is associated with a unique serial number provided by the memory vendor, such as a flash memory unique device ID, the first identification parameter can be generated from the serial number of the memory or one of several memories of the portable data storage device. If there are more than one memories in the portable data storage device, then the serial number of one of the memories is selected for the generation of the first identification parameter. The value of the first identification parameter can be equated to, or mathematically derived from, the selected memory serial number.

Additionally or alternatively, a true random generator in the control logic of the portable data storage device 106, the vending device 104A, or the back-end device 124, may be used to generate a true random number. The true random number alone may be used to generate the first identification parameter. This can be done by equating the value of the first identification parameter to, or mathematically deriving the value of the first identification parameter from, the true random number. Given the randomness in the generated random number, the random number, and hence the first identification parameter generated from the random number, is unique to the respective portable data storage device for which it is generated.

To further enhance the uniqueness of the first identification parameter with respect to the portable data storage device 106, the first identification parameter is generated from either or both the true random number and the selected memory serial number, and then stored in the control logic of the portable data storage device 106 using a one-time programming mechanism. The first identification parameter may then be used as the identification of the portable data storage device. This can be done by equating the value of the first identification parameter to, or mathematically deriving the value Hof the first identification parameter from, a concatenation of or mathematical derivation from a combination of either or both of the selected memory serial number and the true random number.

The one or more memories of the portable data storage device may have a control logic section where the control logic is stored, a protection section, a partition table section, and a data file section. In various embodiments, the first identification parameter may be stored in any, some or all of the control logic section, a system area of the control logic section, the protection section, the partition table section, or the data file section.

During the second stage, labeled as Time 2 in FIG. 4, the first identification parameter is stored at a table. The table can be located at the portable data storage device 106 or the database 120 separate from the portable data storage device 106. In particular, the correlation between the first identification parameter and the memory serial number of one of the one or more data storage media that is unique to the respective data storage medium, the serial number of the portable data storage device, or both, is stored in the database 120. For example, a lookup table correlating the first identification parameter, the memory serial number and/or the portable data storage device serial number can be used. This allows the first identification parameter to be looked up by searching the corresponding memory serial number and/or portable data storage device serial number.

Although FIG. 4 illustrates both of the memory serial number and the portable data storage device serial number being correlated to the first identification parameter, in various embodiments only one of the memory serial number and the portable data storage device serial number is utilized and stored in the database along with the first identification parameter.

During the third stage, labeled as Time 3 in FIG. 4, a data file is stored in, or downloaded to, the portable data storage device 106. Other than data, such as audio, video or textual data, the data file also includes a rights object that defines the access rights with respect to the data. In addition, the rights object contains a second identification parameter, such a second PSID parameter, that is equal to the first identification parameter if the data file is obtained through an authorized vendor and via legitimate means, such as through purchase for example.

When it is indicated that the data file is to be downloaded to the portable data storage device 106, the first identification parameter looked up from the database 120 using either or both of the memory serial number and the portable data storage device serial number. Once found, the first identification parameter is included in the rights object of the data file as the second identification parameter. This serves as a mechanism to ensure that only data of the data files intended for the portable data storage device 106 can be accessed.

Figure 5:
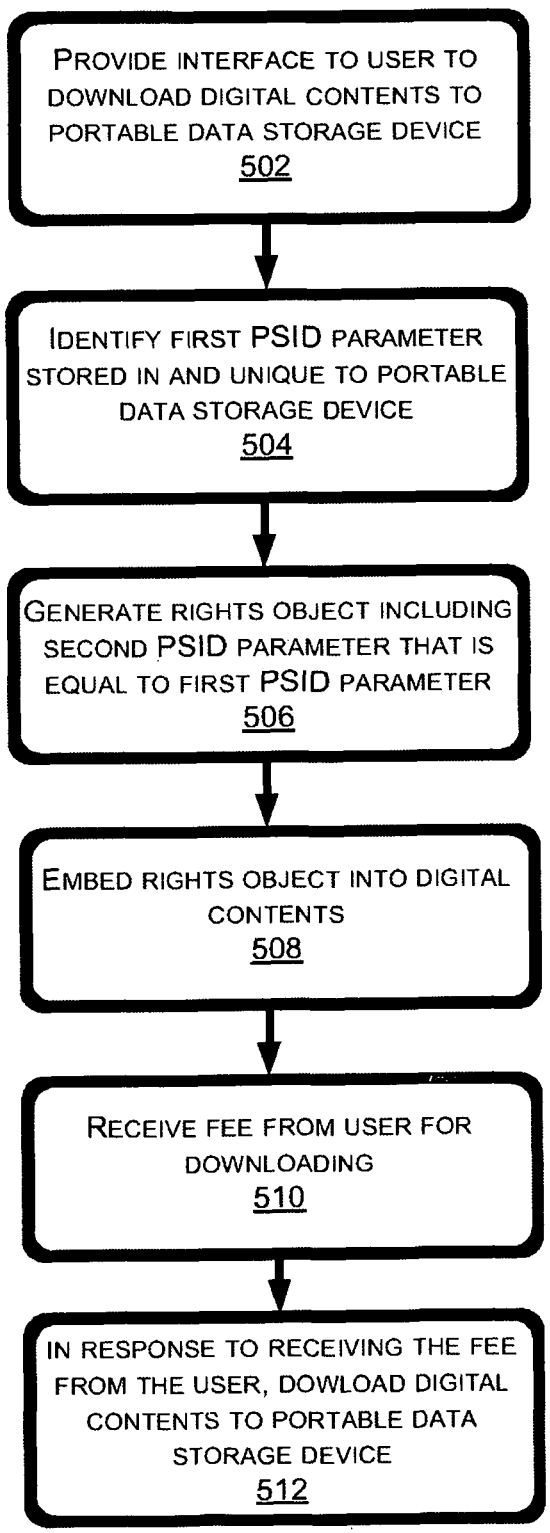
FIG. 5 illustrates another exemplary process 500 of transferring secured data from the vending device to the portable data storage device

FIG. 5 illustrates another exemplary process 500 of transferring secured data from the vending device 104A to the portable data storage device 106.

At 502, a vending device, such as the vending device 104A, configured to provide digital contents, provides an interface to a user to download one or more digital contents to a portable data storage device, such as the portable data storage device 106, in exchange for a payment from the user;

At 504, the vending device identifies a first portable storage identification (PSID) parameter stored in and unique to the portable data storage device;

At 506, the vending device generates a rights object including a second PSID parameter equal to the first PSID parameter;

At 508, the vending device embeds the rights object into the one or more digital contents to prevent the one or more digital contents from being accessed at the portable data storage device unless the second PSID parameter matches the first PSID parameter;

At 510, the vending device receives a payment from the user for downloading the one or more digital content; and At 512, in response to receiving the payment from the user, the vending device downloads the one or more digital contents to the portable data storage device.

In one embodiment, the process 500 further comprises providing, by the vending device, the interface for the user to select the one or more digital contents from a plurality of digital contents available through the vending device.

In one embodiment, the process 500 further comprises grouping, by the vending device, the one or more digital contents selected by the user into an album. In other words, the user can create the album by selection of a number of digital contents at his/her own choice.

In one embodiment, at least one of the first PSID parameter or the second PSID parameter is encrypted. The vending device decrypts a received encrypted first PSID parameter before generation of the second PSID parameter.

In one embodiment, the vending device encrypts the data or the second parameter before the data or the second parameter is provided to be stored in the data file and transferred to the portable data storage device.

Illustrative Vending Device and Portable Data Storage Device

Figure 6:
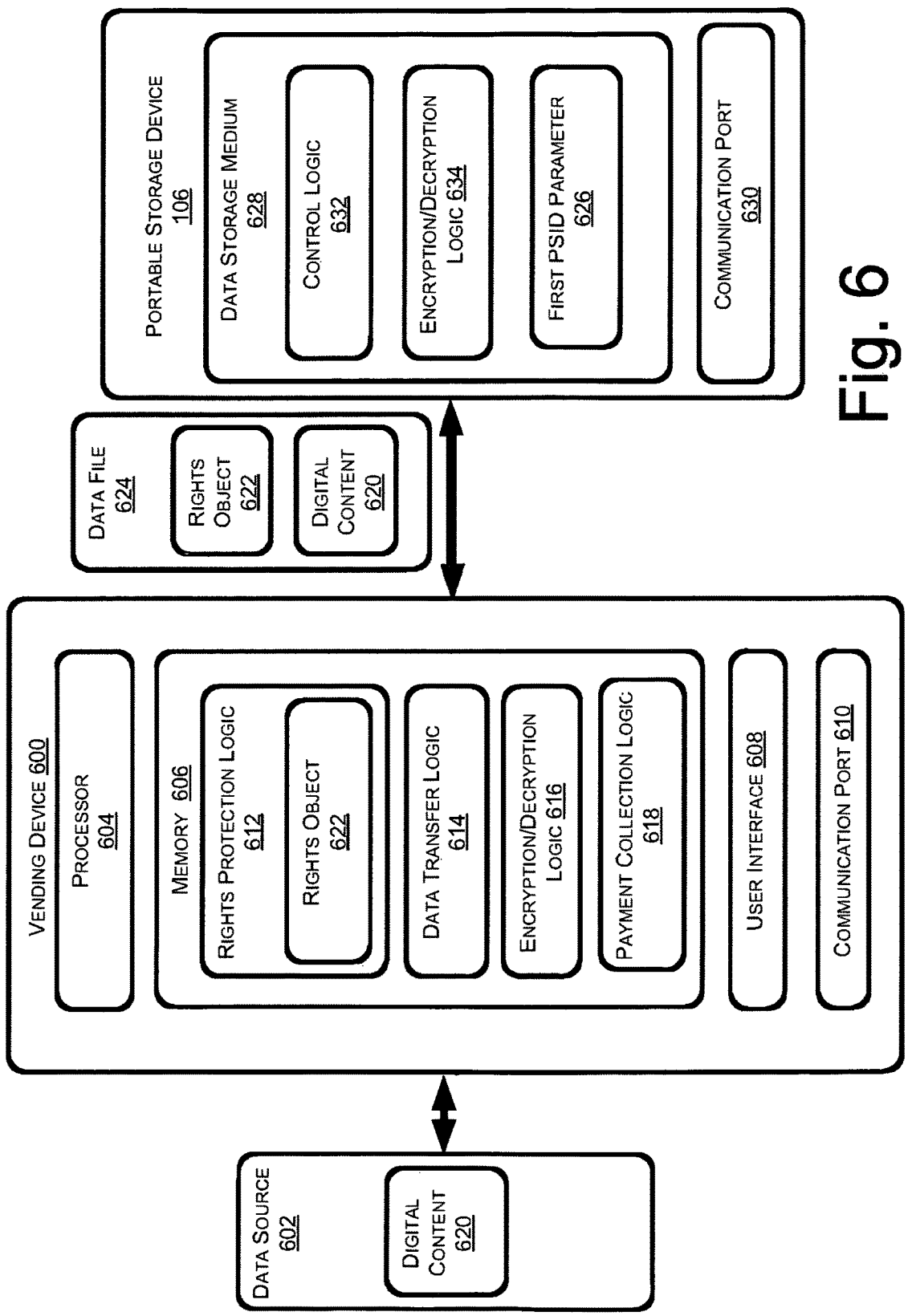
FIG. 6 illustrates an exemplary vending device 600 and an exemplary portable data storage device, and data flow among the vending device, the portable storage device, and a data source other than the vending device.

FIG. 6 illustrates an exemplary vending device 600 and an exemplary portable data storage device 106, and data flow among the vending device 600, the portable storage device 106, and a data source 602.

As shown in the FIG. 6, the vending device 600, as illustrated in the FIG. 5, can be used to implement the techniques described herein, and which may be representative, in whole or in part, of elements described herein. The vending device 600 is only one example and is not intended to suggest any limitation as to the scope of use or functionality of the computer and network architectures.

The components of the vending device 600 include one or more processors 604 and memory 606, a user interface 608, and communication port 610.

Generally, memory 606 contains computer-readable instructions that are accessible and executable by processor 604. Memory 606 may comprise a variety of computer readable storage media. Such media can be any available media including both volatile and, non-volatile storage media, removable and non-removable media, local media, remote media, optical memory, magnetic memory, electronic memory, etc. Any number of program modules or applications can be stored in the memory, including by way of example, an operating system, one or more applications, other program modules, and program data, such as a rights protection logic 612, a data transfer logic 614, an encryption logic 616, collection logic 618. Some of the logics stored at the memory 606 can be located at another device separate of the vending device. The vending device can couple with such separate device with such logics to generate a result.

The user interface 608 is configured to at least provide an interface to the user 108 to receive a request from the user 108 to transfer digital content to the portable data storage device 106. The user interface 608 may also be configured to receive a payment of fee by the user 108 for the requested digital content. The digital content is located at either the vending device 600 or the data source 502 other than the vending device 600. In this example of FIG. 5, the requested digital content 520 is located at the data source 502.

The communication port 610 is configured to communicate with the portable data storage device 106 and the portable data storage device 106.

The rights protection logic 612 is configured to generate a rights object 622, and to embed the right object 622 into a data file 624. The data file 624 includes the digital content 620 and the rights object 622. The rights protection logic 612 firstly locates a first PSID parameter 626 unique to and located at the portable data storage device 106, or creates a first PSID parameter 626 and stores the created first PSID parameter 626 at the portable data storage device 106. The rights protection logic 612 then creates a second PSID parameter equal to the first PSID parameter 626 and includes the second PSID parameter into the rights object 622. Thus the rights protection logic 612 prevent the digital content 620 at the data file 624 from being accessed at the portable data storage device 106 unless the second PSID parameter matches the first PSID parameter.

The data transfer logic 614 is configured to transfer the digital content 620 from the data source, or transfer the data file 624 to the portable data storage device 106.

The encryption/decryption logic 616 is configured to encrypt the digital content 620 or the rights object 622 including the second PSID parameter in the data file 624. In an event that the first PSID parameter 626 is encrypted at the portable data storage device 106, the encryption/decryption logic 616 is also configured to decrypt the encrypted first PSID parameter.

The payment collection logic 618 is configured to payment from the user 108 to transfer the digital content 520.

The portable data storage device 106 includes a data storage medium 628, and a communication port 630. Any number of program modules or applications can be stored in the data storage medium 628, including by way of example, a control logic 632, and an encryption/decryption logic 634. The first PSID parameter 626, unique to the portable data storage device 106 and may be used as the identification of the portable data storage device 106, is also stored at the data storage medium 504.

Although only one data storage medium 628 is shown in FIG. 6, in other embodiments the portable data storage device 106 includes more than one data storage medium. The data storage medium 628 is a memory and, in one embodiment, is a flash memory. Alternatively, the data storage medium 604 is electrically-erasable programmable read-only memories (EEPROM).

The communication port 630 is a data input/output interface of the portable data storage device 106. Construction and operation of the communication port 630 are well-known in the art. Thus, in the interest of brevity, a detailed description of the communication port 630 will not be provided.

The control logic 632 controls access to the data medium 628 through the communication port 630 by the user 108 of the portable data storage device 106. The control logic 632 determines whether or not the first PSID parameter 626 and the second PSID parameter are equal and, if the first PSID parameter 626 and the second PSID parameter are equal, causes the digital content 620 in the data file 624 to be provided to the user 108 in response to a request for the digital content 620 from the user.

The encryption/decryption logic 634 is configured to encrypt the first PSID parameter 626. In an event that either the digital content 620 or the rights objet 622 including the second PSID parameter is encrypted, the encryption/decryption logic 634 is also configured to decrypt the encrypted digital content 620 or the rights object 622.

CONCLUSION

The above-described techniques pertain to secure data storage and transfer between the vending device and the portable data storage device. Although the techniques have been described in language specific to structural features and/or methodological acts, it is to be understood that the appended claims are not necessarily limited to the specific features or acts described. Rather, the specific features and acts are disclosed as exemplary forms of implementing such techniques. Furthermore, although the techniques may have been described in the context of SD memory cards with respect to the portable data storage device, the techniques may be applied in any other suitable context, such as other types of portable data storage devices including USB flash drives, MiniSD cards, and MicroSD cards for example.

What is claimed is:

1. A method of providing data from a vending device to a portable data storage device, the method comprising:
connecting, by a vending device, with a portable data storage device;
receiving, by the vending devices a serial number from the connected portable data storage device;
generating, by the vending device, a portable storage identification parameter (PSID) from the serial number;
storing, by the vending device, the PSID on the connected portable data storage device;
assigning, by the vending device, the PSID to the connected portable data storage device and
recording the assignment with a copy of the PSID in a profile of the portable data storage device, wherein the profile is located at the vending machine or a remote server;
displaying, by the vending device, an interface;
receiving, by the vending device, a request for data via the displayed interface;
locating, by the vending device, the copy of the PSID stored in the profile;

generating, by the vending device, a rights object comprising the copy of the PSID;
creating, by the vending device, a data file by embedding the rights object in the data; and
receiving, by the vending device, a payment from the user; and in response to receiving the payment from the user, storing the data file in the connected portable data storage device.

* * * * *